United States Patent Office 3,395,774
Patented Aug. 6, 1968

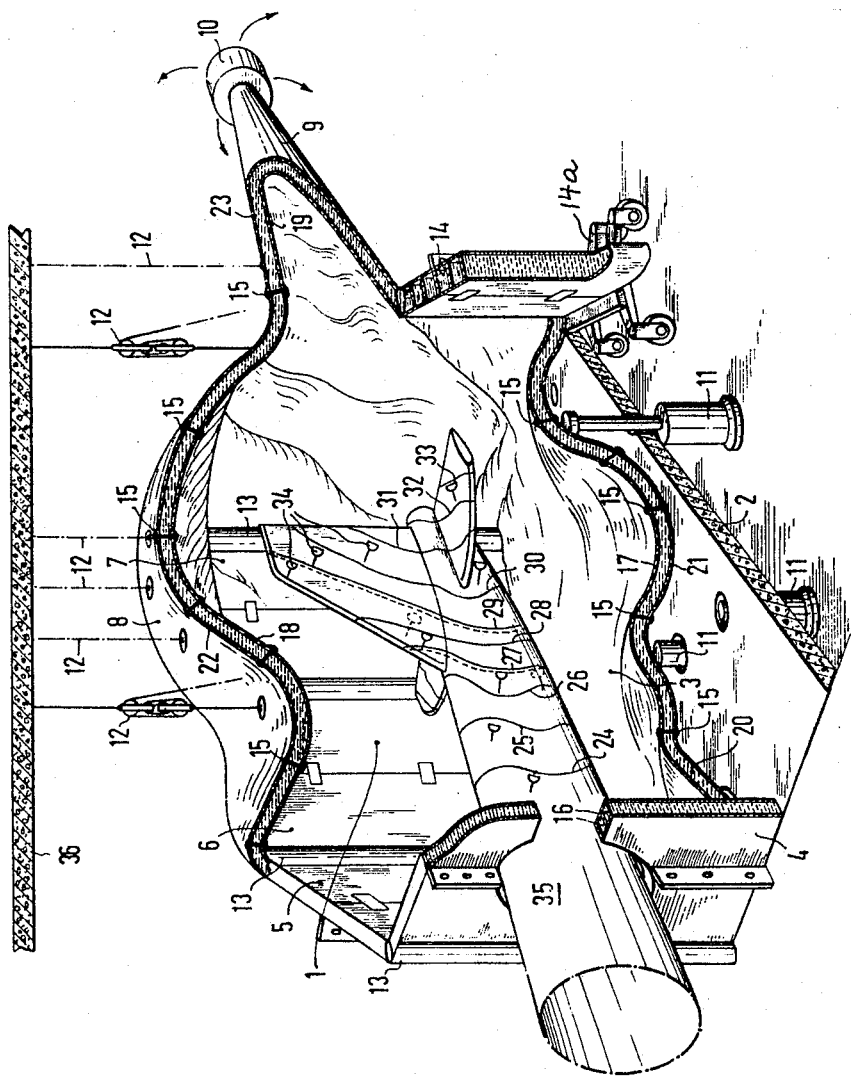

3,395,774
REVERBERATION CHAMBER WITH PARTLY FLEXIBLE MOVABLE WALLS
Kurt Seifert, Destouchesstrasse 36, Munich 8, Germany
Filed Sept. 16, 1966, Ser. No. 580,112
Claims priority, application Germany, Sept. 20, 1965, S 99,512
10 Claims. (Cl. 181—.5)

ABSTRACT OF THE DISCLOSURE

A reverberation chamber for testing or generating sound fields is equipped with walls which are partly flexible and with mechanisms for shifting the flexible wall portions inward and outward until a desired sound distribution is indicated by measuring instruments. The chamber permits a more realistic simulation of actual sound fields in a simpler manner than has been possible heretofore. Various specific wall constructions and moving mechanisms are disclosed.

---

This invention relates to the simulation of actually observed sound fields, and particularly to a method of simulating such sound fields, and to an apparatus for performing the method.

The invention is applicable to the testing of objects or models for predicting their behavior in actual sound fields and to the investigation of large-scale reverberation chambers such as theaters and concert halls. The invention has particular utility in the determination of structural vibrations and modes of natural vibration frequencies in aircraft and missiles which are caused by jet engines, rocket engines, and the random noise produced by turbulence in boundary layers at the outer surface or skin of the airplane or missile when flying through air at high velocity.

It has been practically impossible heretofore to produce sound or noise fields which realistically simulate the last mentioned conditions as they prevail during take-off, during sustained high-velocity flight, and during landing. Because of the low acoustical efficiency (about one percent) of the jet engines, exposures of test models to acoustical fields generated by actual engines have not yielded significant experimental readings, and jets of cold or hot air have not been used with more success.

It is common practice to expose the models or objects to be tested to acoustical energy in reverberation chambers whose walls are acoustically "hard," that is, strongly reflect incident sound waves. If it is desired to produce sound fields in which the acoustical energy is approximately anisotropically distributed, opposite walls of the chamber may be angularly offset from a parallel relationship and acoustical diffusion elements may be resorted to (Sato and Koasu, J. Phys. Soc. Jap., vol. 3/4, No. 3, March 1959, pages 365-373). The nature of the sound field in a conventional reverberation chamber may further be varied by suitable selection of the number and nature of the sound sources employed, and by the choice of horns for transmitting the acoustical energy from the source to the chamber.

The known reverberation chambers have been developed to the point where they adequately simulate sound frequencies and overall sound or noise pressure, but they are inadequate for simulating the even more important sound pressure distribution and its effects on the tested object. Each known reverberation chamber permits only a sound field having a single set of dimensional and spatial properties to be established, and this makes it practically impossible to duplicate an actual sound field produced under different conditions by a different exciting mechanism.

The object of the invention is the provision of facilities for duplicating a wide variety of sound fields in a much more realistic manner than has been available heretofore.

A more specific object is the provision of facilities for reliably predicting the sonic fatigue behavior of objects which are exposed to sound originating in jet engines, to boundary layer noise of high intensity, and to similar acoustically produced stresses.

In one of its aspects, the invention resides in a method of simulating an actual sound field in which acoustical energy is released in a reverberation chamber to establish a sound field in the chamber, and a portion of the wall which surrounds and encloses the chamber is then moved inward or outward of the chamber in such a direction that the sound field in the chamber approaches in its characteristics the actual field which is to be simulated.

The apparatus employed for performing the method may include a wall arrangement which defines a substantially closed chamber therein and is at least partly flexible. A source of sound is provided for generating an acoustical field in the chamber. The flexible wall portion is equipped with moving means which may move it inward and outward of the chamber, and suitable instrumentation is provided for measuring the distribution of sound pressure in the chamber.

Other features, additional objects, and many of the attendant advantages of this invention will be readily appreciated as the same becomes better understood by reference to the following detailed description when considered in connection with the accompanying drawing, the sole figure of which shows a reverberation chamber of the invention in a perspective view, portions of the chamber being removed to reveal internal structure.

The reverberation chamber 1 is bounded vertically by a flexible false bottom 3 and a flexible false ceiling 8 which are backed by a bottom wall 2 of rigid concrete and a top wall 36 which is similar in structure to the bottom wall 2. The chamber is horizontally bounded by a front wall 4, a left side wall consisting of several sections 5, 6, 7, a similar right side wall 14 of which only one section is seen in the drawing, and a partly horn-shaped rear wall 9. A siren 10 at the narrow end of the horn-shaped rear wall portion provides a source of acoustical energy for the chamber 1.

Jacks 11 approximately uniformly distributed over the top face of the bottom wall 2 in a manner only partly illustrated engage respective portions of the false bottom 3. The false ceiling 8 is suspended from the top wall 36 by a group of cables 12, or similar tension members which are trained over partly illustrated pulleys to a second set of jacks in a conventional manner, not shown, so that the several portions of the false ceiling 8 may be raised and lowered individually. Some of the cables 12 also support the horn-shaped portion of the rear wall 9, and these cables are attached to non-illustrated carriages on the ceiling 36 which permits the horn to be moved horizontally inward of the chamber 1 relative to the remainder of the wall 9.

The front wall 4 consists of inner and outer shells of the flexible material described below. The shells form a jacket which is stiffened and divided by partitions into compartments 16 normally filled with a liquid core 20. An opening in the front wall 4 is substantially closed by the fuselage of a VTOL aircraft 35 whose rear portion and empennage project into the chamber 1.

The several side wall sections 5, 6, 7, 14 are secured to each other, to the front wall 4 and to the rear wall 9 by hinges 13. Each side wall section has shells confining a normally liquid core 20 as described with reference to the front wall 4, and is mounted on a carriage 14a in the manner shown with respect to the section 14 only. A motor on each carriage (not shown) permits the side wall sections to be swung on their hinges 13 and to be moved thereby inward and outward of the chamber 1.

The false bottom 3 and ceiling 8 have outer and inner shells of acoustically hard, flexible material such as rubber, nylon fabric, or plastic having a thickness of approximately 0.5 to 30 mm., depending on the overall dimensions of the chamber and on the operating conditions. If a jet of hot gasses is released into the chamber 1, the inner shells 17, 18 of the false bottom and ceiling are made of asbestos fabric treated to make it impermeable to the liquid core. The flexible inner shells 17, 18 are held apart from the flexible outer shells 21, 22 of the false bottom 3 and false ceiling 8 by numerous spacers 15. Each spacer consists of a tubular outer member fastened to one of the shells, and an inner member partly received in the outer member in telescoping engagement. A conventional, partly threaded adjusting spindle, not shown, permits the length of each spacer 15 to be adjusted. The spindle is axially secured in one member of the spacer and threadedly engages the other. Its slotted head is accessible from the chamber 1.

Flexible tubes (not shown) are arranged in the liquid 20 between the shells of the bottom 3 and ceiling 8 and are connected to sources of heated and of refrigerated brine to freeze and thaw the liquid 20 or otherwise change its temperature as needed.

The detail structure of the rear wall 9 is closely similar to that of the bottom 3 and of the ceiling 8. An inner shell 19 of the rear wall 9 is separated from an outer shell 23 by a body of liquid 20, and the two shells are held apart by spacers 15.

Before operating the apparatus illustrated, the sound pressure distribution prevailing over the fuselage and the empennage of the aircraft 35 is determined under actual take-off, flight, and landing conditions in a known manner by means of microphones 34 suitably distributed over the aircraft skin. The sound pressure produced by the jet engines is highest on the rear part of the fuselage and on the empennage when the engines are wing mounted, as is being assumed in the instant case. The operational tests permit lines 24 to 33 of equal sound or noise pressure to be established on the craft.

Microphones 34 are similarly placed on the portion of the aircraft enclosed in the reverberation chamber 1, and the siren 10 is operated at a frequency commensurate with the actually observed noise frequency. The sound pressure distribution in the chamber 1 is then varied by moving the wall portions 3, 5 to 9, and 14 inward and outward of the chamber 1 until it approaches that observed under actual operating conditions as closely as desired. The horn-shaped portion of the rear wall 9 may be moved very closely to the aircraft 35 to simulate the sound pressure distribution represented by the lines 24 to 33. No fixed rules other than those that would be obvious to one trained in aerodynamics and acoustics have been developed at this time, but a reasonable simulation of actual operating conditions can be established in the chamber 1 by trial and error alone without much difficulty. The drawing depicts the necessary configuration of the chamber 1 in the case of the illustrated aircraft in a realistic manner.

When the proper configuration of the chamber 1 has been established, the tested aircraft may be subjected to sonic stresses closely analogous to those encountered in service for extended periods to determine the fatigue properties of the materials of construction employed. The noise pressure distribution due to mild gusts of wind may be simulated as closely as those due to a rocket engine or jet engine.

Water forms a suitable liquid core under most conditions, but paraffin may be employed where operating temperatures are elevated. The liquid-cored chamber walls have the additional advantage of containing noise within the chamber 1 as described in more detail in my German Patent No. 1,169,105.

It will be appreciated that relatively rigid walls 4–7, 14 and relatively soft walls 3, 8, 9 having correspondingly different coefficients of sound reflection may be distributed about a reverberation chamber of the invention in surface area ratios different from that illustrated further to modify the sound or noise pressure distribution within the chamber. The use of sound absorbing overlays such as foamed plastics and other conventional expedients will readily suggest themselves where conditions so require.

The method of the invention has been found to be applicable to the prediction and modification of the acoustical properties of theater and concert halls. It is known to build a model of the proposed hall having rigid fixed walls and to install experimentally highly reflecting and sound absorbing wall facings on various portions of the model in order to avoid the formation of pockets in which the sound intensity is significantly lower or higher than in the remainder of the hall. It has now been found that substantial improvement in the acoustics of a hall model can be achieved by shifting a double wall of high acoustical hardness inward or outward of the model hall. Relatively large wall portions can readily be moved in the necessary manner because of their light weight. The optimum wall configuration determined in this manner provides valuable guidance for the architect in designing the hall.

The reverberation chamber illustrated in the drawing has also been found valuable for testing objects at extremely low frequencies of sound, such as 1 cycle per second, which cannot readily be produced in known equipment. An entire wall of the chamber 1 may be cyclically moved inward and outward of the chamber by means of the jacks 15 or the motors 14b at the desired frequency of oscillation.

The necessary hydraulic, and electrical circuits, the heating and refrigerating equipment necessary for operating the apparatus illustrated in the manner described are conventional as are automatic controls which may permit the relative positions of the several chamber walls to be changed according to a predetermined program based on previous experience so that the intervention of an operator may be limited to observation of the results obtained and ultimate fine adjustments as soon as the instruments connected to the microphones 34 in the chamber 1 indicate close approach to the desired acoustical characteristics by the changes controlled by the automatic programming apparatus.

It should be understood, of course, that the foregoing disclosure relates to only a preferred embodiment of the invention, and that it is intended to cover all changes and modifications of the examples of the invention herein chosen for the purpose of the disclosure which do not constitute departures from the spirit and scope of the invention set forth in the appended claims.

What I claim is:
1. An apparatus for simulating an actual sound field comprising, in combination:
 (a) wall means defining a chamber therein, at least a portion of said wall means being flexible;
 (b) a source of sound for generating a sound field in said chamber;
 (c) moving means for moving said flexible portion of the wall means inward and outward of said chamber; and
 (d) measuring means for measuring the distribution of sound pressure in said chamber.

2. An apparatus as set forth in claim 1, wherein said portion of the wall means has an inner shell portion bounding said chamber, and an outer shell portion spaced from said inner shell portion outwardly of said chamber, said shell portions being of a material substantially impermeable to liquid.

3. An apparatus as set forth in claim 2, further comprising adjusting means for varying the spacing of said shell portions from each other.

4. An apparatus as set forth in claim 1, wherein said moving means include means for hingedly swinging said portion of the wall means relative to the remainder of the wall means.

5. An apparatus as set forth in claim 1, wherein said moving means include a plurality of spaced jack means respectively engaging a plurality of spaced portions of said wall means for moving the same inward and outward of said chamber.

6. An apparatus as set forth in claim 1, wherein said portion of the wall means upwardly bounds said chamber, and said moving means include a plurality of horizontally spaced tension members respectively engaging a plurality of spaced parts of said portion.

7. An apparatus as set forth in claim 1, wherein said flexible portion of said wall means is horn-shaped and normally projects from the remainder of said wall means in a predetermined direction outward of said chamber, so as to have respective terminal parts normally adjacent to and remote from said chamber, said source of sound communicating with the terminal part of said horn-shaped portion remote from said chamber, and said moving means including means for moving the terminal part of said horn-shaped portion near said chamber inward of the latter.

8. An apparatus as set forth in claim 1, wherein said moving means include means for oscillating said portion of the wall means inward and outward of said chamber.

9. An apparatus as set forth in claim 1, wherein said chamber is substantially closed.

10. A method of simulating an actual sound field which comprises:
(a) enclosing a reverberation chamber in a continuous surrounding wall;
(b) releasing acoustical energy in said chamber to establish a sound field in said chamber; and
(c) deforming a portion of said wall to move said portion inward or outward of said chamber to make the sound field in the chamber more similar to said actual sound field.

References Cited
UNITED STATES PATENTS 3,208,552 9/1965 Seifert.
3,270,835 9/1966 Kramer.
3,300,567 1/1967 Sear _____ 181—.5 X BENJAMIN A. BORCHELT, *Primary Examiner.*

G. H. GLANZMAN, *Assistant Examiner.*